US008505969B2

United States Patent
Mendez

(10) Patent No.: US 8,505,969 B2
(45) Date of Patent: Aug. 13, 2013

(54) KNEE AIRBAG MODULE

(75) Inventor: Gerardo Mendez, West Bloomfield, MI (US)

(73) Assignee: TK Holdings Inc., Auburn Hills, MI (US)

( * ) Notice: Subject to any disclaimer, the term of this patent is extended or adjusted under 35 U.S.C. 154(b) by 232 days.

(21) Appl. No.: 12/910,730

(22) Filed: Oct. 22, 2010

(65) Prior Publication Data

US 2011/0095512 A1 Apr. 28, 2011

Related U.S. Application Data

(60) Provisional application No. 61/272,729, filed on Oct. 27, 2009.

(51) Int. Cl.
*B60R 21/206* (2011.01)
*B60R 21/231* (2011.01)
*B60R 21/233* (2006.01)

(52) U.S. Cl.
USPC ............ 280/743.1; 280/729; 280/730.1; 280/732; 280/743.2

(58) Field of Classification Search
USPC ............ 280/729, 732, 730.1, 743.1, 743.2
See application file for complete search history.

(56) References Cited

U.S. PATENT DOCUMENTS

| 4,186,941 | A | * | 2/1980 | Scholz et al. | 280/743.1 |
|---|---|---|---|---|---|
| 4,290,627 | A | * | 9/1981 | Cumming et al. | 280/729 |
| 5,333,903 | A | * | 8/1994 | Eyrainer et al. | 280/743.1 |
| 6,945,557 | B2 | | 9/2005 | Takimoto et al. | |
| 7,314,230 | B2 | * | 1/2008 | Kumagai et al. | 280/730.1 |
| 7,434,837 | B2 | * | 10/2008 | Hotta et al. | 280/743.2 |
| 7,766,374 | B2 | * | 8/2010 | Abele et al. | 280/730.1 |
| 8,083,254 | B2 | * | 12/2011 | Enders et al. | 280/728.2 |
| 2007/0222189 | A1 | | 9/2007 | Baumbach et al. | |
| 2007/0246920 | A1 | * | 10/2007 | Abele et al. | 280/730.1 |
| 2008/0067789 | A1 | | 3/2008 | Freisler et al. | |
| 2009/0085333 | A1 | * | 4/2009 | Imaeda et al. | 280/730.1 |

* cited by examiner

*Primary Examiner* — Toan To
*Assistant Examiner* — George Spisich
(74) *Attorney, Agent, or Firm* — Foley & Lardner LLP

(57) ABSTRACT

A knee airbag module for protecting a vehicle occupant comprising a housing containing an inflatable airbag and an inflator for providing gas for inflating the airbag; and wherein the airbag is configured to inflate and deploy out of the housing into a position forward of the knees of the occupant; where the airbag includes front and rear panels that are connected together to form an inflatable chamber; wherein when the airbag deploys the front panel is positioned adjacent to an instrument panel of the vehicle and the rear panel is positioned adjacent to the occupant; wherein the cross-sectional vertical length of the front panel is shorter than the cross-sectional vertical length of the rear panel thereby causing the airbag to deploy upwardly.

17 Claims, 7 Drawing Sheets

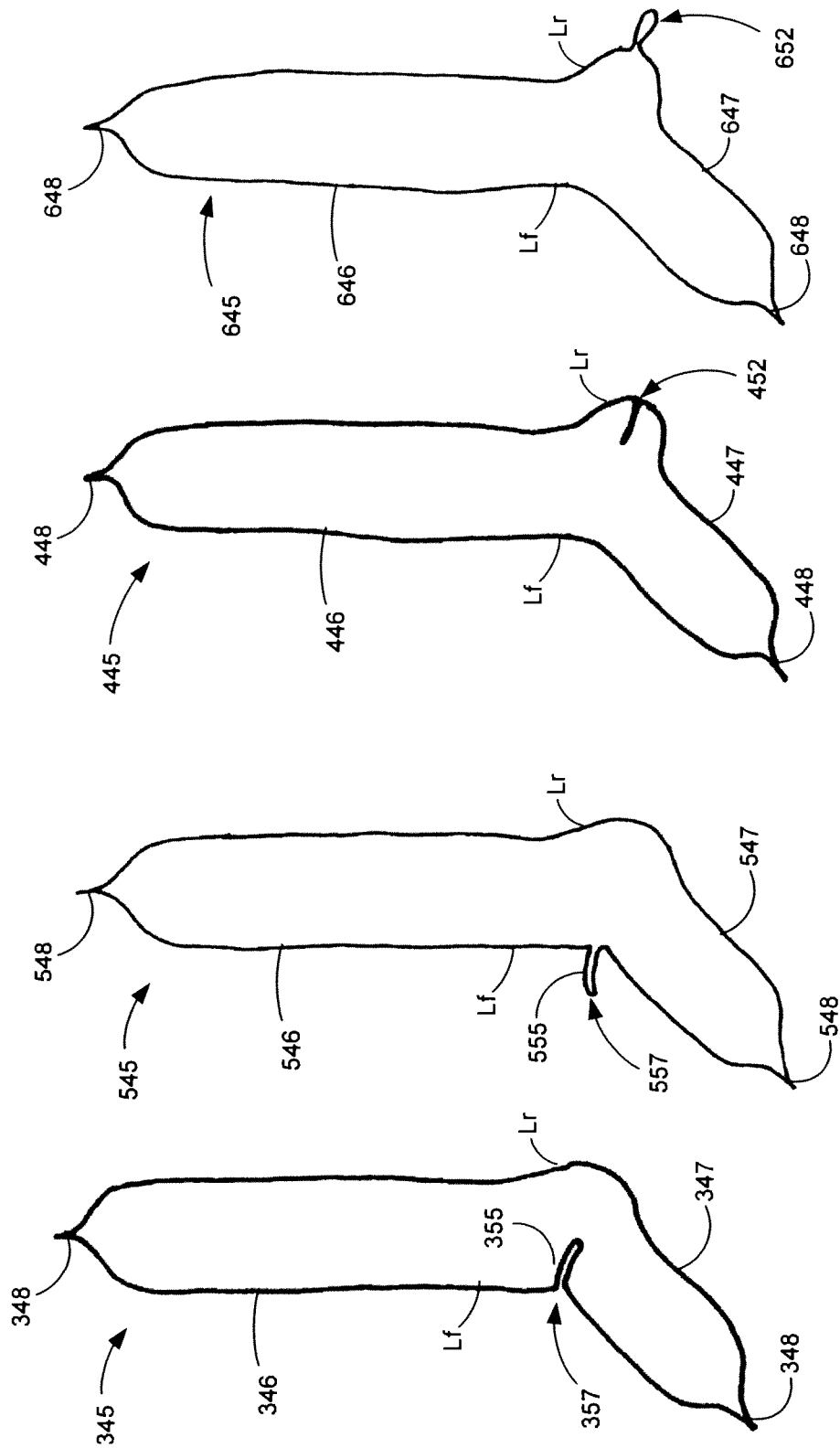

ical vertical length of the front panel being shorter than the cross-sectional vertical length of the rear panel, wherein the pleat may be located in the front panel. The front panel may include an opening and the pleat may be formed in the front panel by connecting the edges of the opening. Alternatively, the front panel may include a folded portion and the pleat may be formed by tucking the folded portion into the inflatable chamber, wherein the front panel may include a substantially horizontal seam positioned to maintain the folded portion in the inflatable chamber. The airbag cushion may further comprise a second pleat located in the rear panel, wherein the second pleat is configured to reduce the perimeter of the rear panel to substantially match the perimeter the front panel.

KNEE AIRBAG MODULE

CROSS-REFERENCE TO RELATED PATENT APPLICATIONS

This application claims priority to and the benefit of U.S. Provisional Patent Application No. 61/272,729, filed on Oct. 27, 2009. The foregoing provisional application is incorporated by reference herein in its entirety.

BACKGROUND

The present application relates generally to the field of airbags for motor vehicles. More specifically, this disclosure relates to an airbag module having a knee airbag configured to deploy from the lower portion of a dashboard initially in the substantially downward direction whereby the knee airbag has an improved deployment trajectory to reduce the likelihood of occupant injury.

SUMMARY

One embodiment of the invention relates to a knee airbag module for protecting a vehicle occupant comprising a housing containing an inflatable airbag and an inflator for providing gas for inflating the airbag. The airbag is configured to inflate and deploy out of the housing into a position forward of the knees of the occupant. The airbag includes front and rear panels that are connected together to form an inflatable chamber, wherein when the airbag deploys the front panel is positioned adjacent to an instrument panel of the vehicle and the rear panel is positioned adjacent to the occupant, wherein the cross-sectional vertical length of the front panel is shorter than the cross-sectional vertical length of the rear panel thereby causing the airbag to deploy upwardly.

The front and rear panels may include a substantially horizontal pleat thereby resulting in the cross-sectional vertical length of the front panel being shorter than the cross-sectional vertical length of the rear panel, wherein the pleat may be located in the front panel. The front panel may include an opening and the pleat may be formed in the front panel by connecting the edges of the opening. Alternatively, the front panel may include a folded portion and the pleat may be formed by tucking the folded portion into the inflatable chamber, wherein the front panel may include a substantially horizontal seam positioned to maintain the folded portion in the inflatable chamber. The airbag module may further comprise a second pleat located in the rear panel, wherein the second pleat is configured to reduce the perimeter of the rear panel to substantially match the perimeter the front panel.

Alternatively, the front and rear panels may include a substantially horizontal pleat thereby resulting in the cross-sectional vertical length of the front panel being shorter than the cross-sectional vertical length of the rear panels, wherein prior to connecting the first and second panels together to form the airbag cushion the length of the perimeter of the rear panel is greater than the length of the perimeter for the front panel, and wherein the pleat is located in the rear panel. The pleat may be formed by a connected pair of edge portions of the rear panel to thereby reduce the perimeter of the rear panel to substantially match the perimeter of the front panel, wherein the rear panel may include a second pleat formed on a horizontally opposite side of the perimeter of the rear panel.

Another embodiment of the invention relates to a knee airbag cushion for use in an airbag module for restraining a vehicle occupant comprising a front panel, and a rear panel connected to the front panel to form an inflatable chamber, wherein the inflatable chamber is configured to inflate to deploy the airbag cushion out of the airbag module into a position forward of the lower legs of the occupant, wherein when the airbag deploys to the position forward of the lower legs of the occupant the front panel is positioned adjacent to an instrument panel of the vehicle and the rear panel is positioned adjacent to the occupant, and wherein the cross-sectional vertical length of the front panel is shorter than the cross-sectional vertical length of the rear panel thereby causing the airbag to deploy upwardly.

The front and rear panels may include a substantially horizontal pleat thereby resulting in the cross-sectional vertical length of the front panel being shorter than the cross-sectional vertical length of the rear panels, wherein the pleat may be located in the front panel. The front panel may include an opening and the pleat may be formed in the front panel by connecting the edges of the opening. Alternatively, the front panel may include a folded portion and the pleat may be formed by tucking the folded portion into the inflatable chamber, wherein the front panel may include a substantially horizontal seam positioned to maintain the folded portion in the inflatable chamber. The airbag cushion may further comprise a second pleat located in the rear panel, wherein the second pleat is configured to reduce the perimeter of the rear panel to substantially match the perimeter the front panel.

Alternatively, the front and rear panels may include a substantially horizontal pleat thereby resulting in the cross-sectional vertical length of the front panel being shorter than the cross-sectional vertical length of the rear panels, wherein prior to connecting the first and second panels together to form the airbag cushion the length of the perimeter of the rear panel is greater than the length of the perimeter for the front panel, and wherein the pleat is located in the rear panel. The pleat may be formed by a connected pair of edge portions of the rear panel to thereby reduce the perimeter of the rear panel to substantially match the perimeter of the front panel, wherein the rear panel may include a second pleat formed on a horizontally opposite side of the perimeter of the rear panel.

BRIEF DESCRIPTION OF THE DRAWINGS

FIG. 9A is a side view of another exemplary embodiment of a knee airbag cushion having a front pleat located on the front panel, where the pleat is folded into the cushion.

FIG. 9B is a side view of another exemplary embodiment of a knee airbag cushion having a front pleat located on the front panel, where the pleat is folded away from the cushion.

FIG. 10A is a side view of yet another exemplary embodiment of a knee airbag cushion having a rear pleat located on the rear panel, where the pleat is folded into the cushion.

FIG. 10B is a side view of yet another exemplary embodiment of a knee airbag cushion having a rear pleat located on the rear panel, where the pleat is folded away from the cushion.

DETAILED DESCRIPTION

Knee airbags provide occupant protection by restraining the occupant during dynamic vehicle events, such as rapid decelerations caused by the vehicle impacting another vehicle or barrier. The knee airbag restrains the occupant by substantially reducing the inertia of the occupant and the resulting tendency of the occupant to submarine (i.e., where the legs of the occupant slide forward along the seat cushion leading with the knees and whereby the torso of the occupant follows sliding down the seat back and forward) during a frontal impact of the vehicle. Knee airbags also provide occupant protection by preventing contact of the occupant (e.g., the knees of the occupant) with features (e.g., dashboard) of the vehicle induced by a dynamic impact of the vehicle.

Knee airbag modules or systems include an inflatable airbag cushion that deploys during a dynamic vehicle event and inflates from gas which is rapidly pushed into the airbag cushion by means of an inflator or other inflating device. An inflator or inflator module may use a device, such as a pyrotechnic device or other airbag inflation device, to generate gas almost instantaneously and to push the gas at a high volumetric flow rate into the inflatable airbag cushion of the airbag system to enable the airbag cushion to deploy or unfold over a very short period of time. The airbag cushions of knee airbag modules are typically packaged through a process of folding, rolling, or a combination of folding and rolling to compact the airbag cushion to be able to fit into the small cross-section (and volume) of the storage area (and volume), such as the dashboard.

Figure 3A:
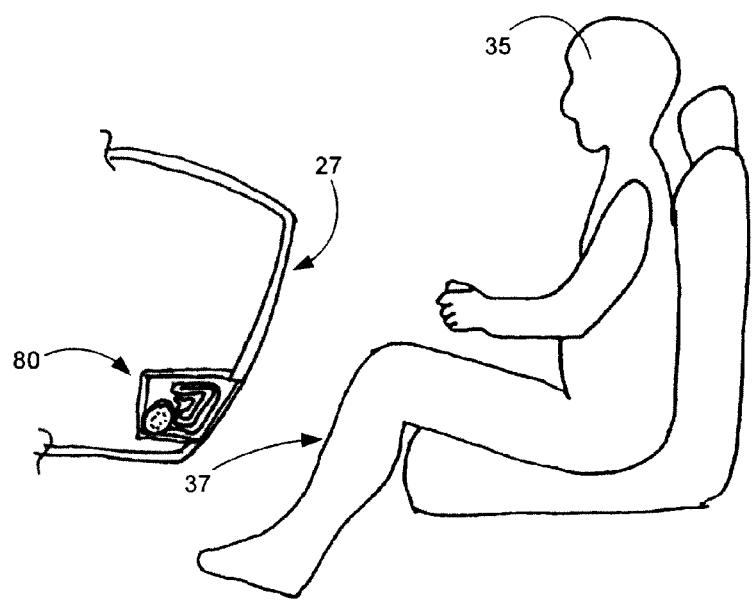
FIG. 3A is a side view of a conventional knee airbag stored within the dashboard and configured to initially deploy in the rearward direction.
Figure 3B:
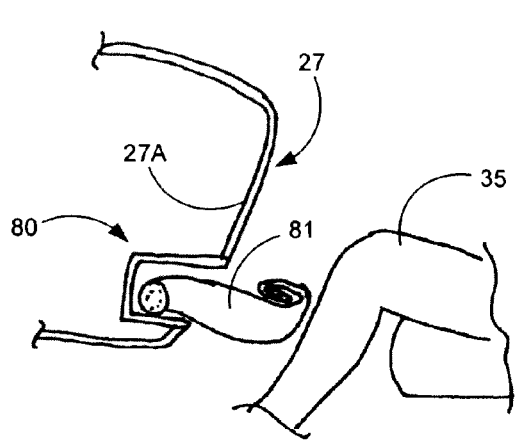
FIG. 3B is a side view of the convention knee airbag of FIG. 3A shown initially deploying rearward directly toward the lower legs of the occupant.
Figure 3C:
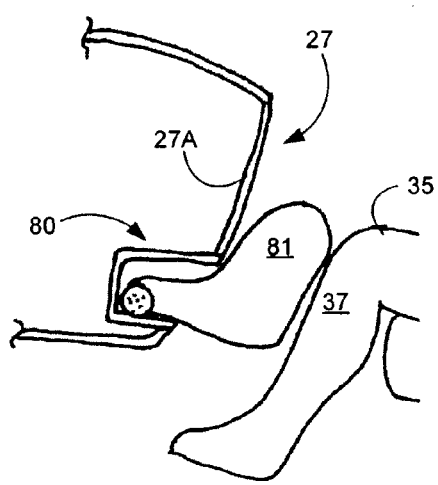
FIG. 3C is a side view of the conventional knee airbag of FIG. 3A shown deployed.

Conventional knee airbag modules, such as the passenger knee airbag module 80 shown in FIGS. 3A-3C, are typically configured to be stored within the dashboard 27 (or other vehicle component) and to include an airbag cushion 81 that deploys from the substantially rearward facing portion or rearward wall 27A of the dashboard 27 in the rearward direction directly toward the occupant 35, such as toward the lower legs (e.g., tibia and fibula) 37 of the occupant 35.

The conventional configuration of knee airbag modules has several limitations or disadvantages, only a couple of which are discussed herein. A first disadvantage is the rearward deploying knee airbag has a relative higher punch force (i.e., the force imparted on the occupant or portion of the occupant upon contact between the deploying airbag cushion and the occupant). A second disadvantage is the rearward deploying knee airbag module reduces the utility of the vehicle, such as by reducing the storage volume of the glove box, since the rearward deploying knee airbag module occupies the volume that otherwise would be usable glove box storage volume. The reduced usable storage volume of the dashboard is often exacerbated by the inclusion of a torso (or thorax) airbag module (not shown) that is typically provided within the dashboard 27 and is configured to provide restraint (and protection) to the occupant, such as the torso or thorax of the occupant. The reduced volume in the rearward facing portion of the dashboard is not limited to a reduced glove box utility, as the reduced dashboard volume prevents packaging of other useful devices in the same volume, such as a radio or radio amplifier.

A knee airbag module may be configured to couple to the bottom portion of the dashboard, where the airbag module includes an inflatable airbag cushion that initially deploys substantially in the downward direction, then continues to deploy in a substantially upward oblique direction along the rearward facing wall of the dashboard, allows for optimization of the utility of the dashboard (e.g., glove box), as well as reduces the impact (or punch) force imparted onto the occupant from the deploying airbag cushion at contact.

Figure 1:
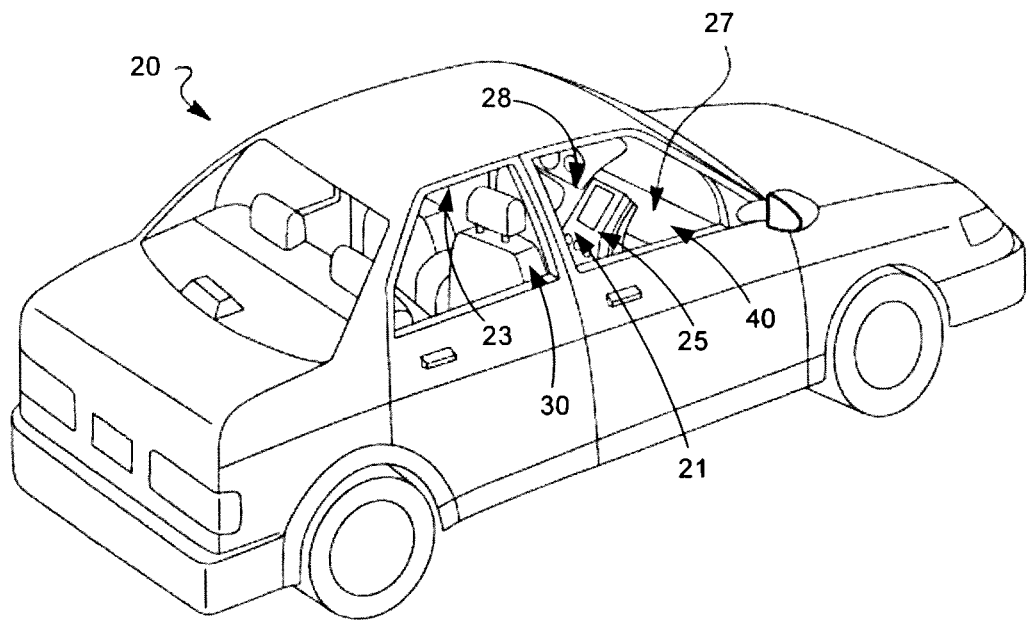
FIG. 1 is a perspective view of an exemplary embodiment of a motor vehicle.

With reference to FIG. 1, an exemplary embodiment of an automotive vehicle 20 is illustrated, and includes an interior compartment 21. The interior compartment 21, as shown, includes a driver side 23 and a passenger side 25, where each may be configured to include at least one airbag module or system. The interior compartment 21 further includes a dashboard 27 extending about the width of the interior compartment 21 of vehicle 20 and housing an instrument panel 28 and a storage compartment (not shown), such as a glove-box, to provide storage utility. The passenger side 25 and the driver side 23 of the interior compartment 21 include a seat assembly 30 to provide seating to an occupant (not shown) of vehicle 20. The interior compartment 21 further includes one or more than one airbag module 40 to provide restraint to at least one occupant upon deployment. Those skilled in the art will recognize that the knee airbag modules disclosed herein can be included within any passenger compartment (e.g., driver side, passenger side, rear passenger) and is not limited by the illustrations herein. It should be noted that the airbag modules disclosed herein may be incorporated to protect any occupant of any vehicle.

Figure 2:
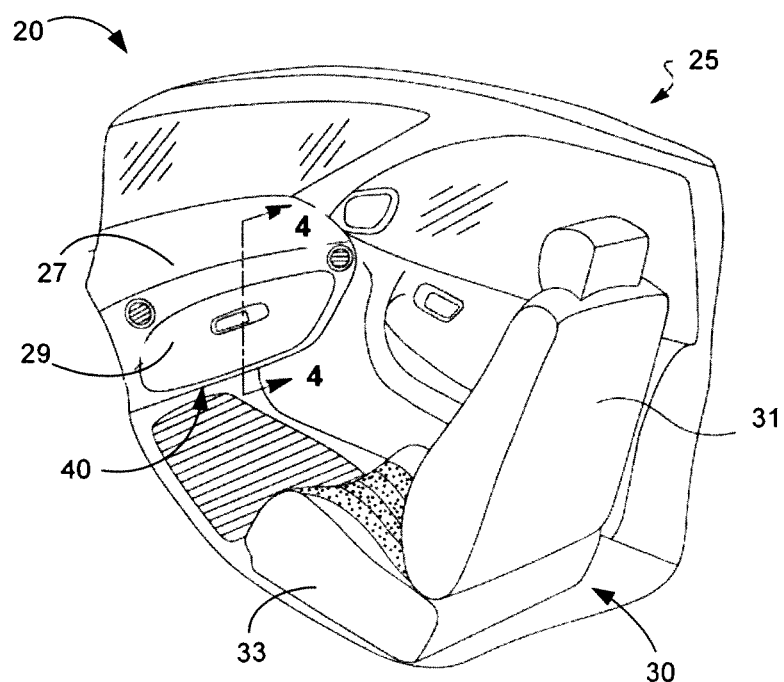
FIG. 2 is a perspective view of the passenger side of the an interior compartment of a motor vehicle, such as the motor vehicle of FIG. 1.

With reference to FIG. 2, an exemplary embodiment of the passenger side 25 of the interior compartment 21 of vehicle 20 is illustrated to include a seat assembly or system 30 configured to provide seating to a vehicle occupant (not shown). The seat system 30 includes a seat back 31 and a seat cushion (or bottom) 33. The dashboard 27 is shown forward of seat system 30 in vehicle 20, and includes a glove box 29 and an airbag module 40 provided below the glove box 29. According to an exemplary embodiment, the airbag module 40 is a knee-airbag configured to provide restraint to the legs, such as the lower legs, of the occupant and to prohibit the tendency of the occupant to submarine.

Figure 4A:
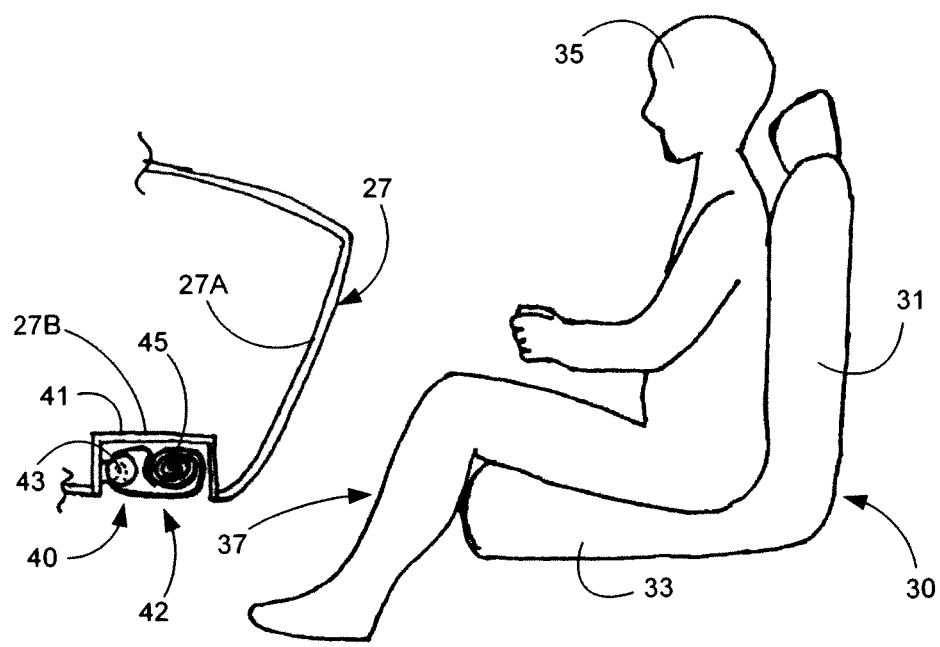
FIG. 4A is a side-sectional view of the passenger compartment of FIG. 2 illustrating an exemplary embodiment of a passenger knee airbag module having a knee airbag cushion shown stored and configured to initially deploy substantially downward from the dashboard of the vehicle.
Figure 4B:
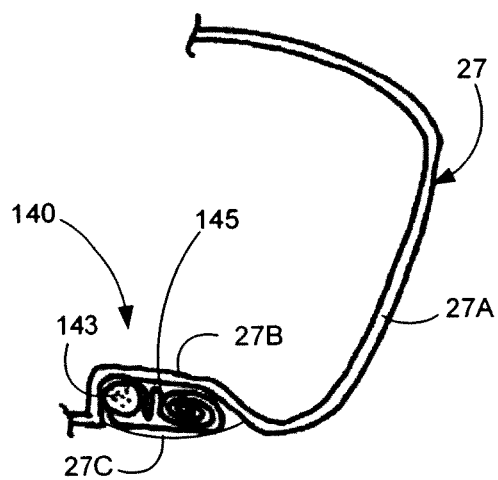
FIG. 4B is a side-sectional view of another exemplary embodiment of a knee airbag module having a knee airbag cushion shown stored and configured to deploy substantially downward from the dashboard of the vehicle.
Figure 4C:
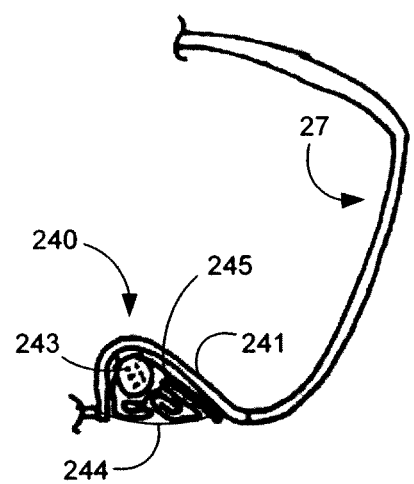
FIG. 4C is a side-sectional view of yet another exemplary embodiment of a knee airbag module having a knee airbag cushion shown stored and configured to deploy substantially downward from the dashboard of the vehicle.

With reference to FIGS. 4A-4C, exemplary embodiments of knee airbag modules are illustrated in the stored configuration and prior to deployment. According to an exemplary embodiment, the knee airbag module 40 includes a housing 41, an inflator 43 coupled to the housing 41, and a knee airbag cushion 45 provided within the housing 41 and configured to receive inflation gas from the inflator 43.

The housing 41 of the knee airbag module 40 may be made from steel or a composite material that is high strength to withstand the high forces generated during airbag deployment. According to an exemplary embodiment, the housing 41 is hexahedron shaped having an opening 42 in place of the lower wall or face. The housing 41 is configured to couple to the lower portion 27B of the dashboard 27, so that the opening 42 of the housing 41 faces in a substantially downward direction, whereby deployment of the airbag cushion 45 may initially deploy substantially downward. According to other embodiments, such as the housing 241, the housing may be any suitable shape and may be configured to match the shape of the receiving portion of the dashboard 27 in which the housing couples to. The opening 42 may be covered by a flexible member 244, such as a door, where upon deployment of the airbag module 240, the inflator 243 expands the knee airbag cushion 245 causing the airbag cushion 245 to breach the flexible member 244 and deploys through the opening created. The inflator may be coupled to the housing and configured to provide inflation gas to the airbag cushion to inflate or deploy the airbag cushion.

According to another exemplary embodiment, lower portion 27B of the dashboard is configured to provide the strength to withstand the forces generated during airbag deployment, whereby the inflator 143 of the airbag module 140 couples directly to the lower portion 27B. The lower portion 27B may be configured with any suitable shape and the airbag module 140 may vary in shape to accommodate the lower portion 27B. After the airbag module 140 is installed into the lower portion 27B, a member 27C, such as a door, may be installed to cover the airbag module 140 until deployment, whereby the deploying airbag cushion 145 expands due to inflation gas from the inflator 143 and breaches the member 27C without impediment or delay during deployment.

With reference to FIGS. 9A and 9B, exemplary embodiments of knee airbag cushions are shown having front pleats. According to the exemplary embodiment shown in FIG. 9A, the knee airbag cushion 345 includes a first (or front) panel 346 connected to a second (or rear) panel 347 along a seam 348 to form an inflatable chamber. The front panel 346 includes a front pleat 357 having a fold 355 tucked into the inflatable chamber of the cushion and configured as described below. According to the exemplary embodiment shown in FIG. 9B, the knee airbag cushion 545 includes a front panel 546 connected to a rear panel 547 along a seam 548 to form an inflatable chamber. The front panel 546 includes a front pleat 557 having a fold 555 directed away from the inflatable chamber of the cushion and configured as described below.

The front panels 346, 546 have cross-sectional vertical lengths Lf that are shorter than the cross-sectional vertical lengths Lr of the respective rear panels 347, 547 to cause the airbag cushion 345, 545 to deploy upwardly. The cross-sectional vertical lengths Lf of the front panels 346, 546 for airbag cushions 345, 545 are measured from the upper edge of the seam 348, 548 to the lower edge of the seam 348, 548, since the seams 348, 548 are located at the substantial mid-depth (or thickness) of the airbag cushions upon deployment. Additionally, the cross-sectional vertical lengths Lr of the rear panels 347, 547 for the airbag cushions 345, 545 are measured from the upper edge of the seam 348, 548 to the lower edge of the seam 348, 548, since the seams 348, 548 are located at the substantial mid-depth of the airbag cushions upon deployment. According to an exemplary embodiment, the cross-sectional vertical lengths taken along the front and rear panels are taken at substantially the mid-width of the panels in the cross-car direction.

With reference to FIGS. 10A and 10B, exemplary embodiments of knee airbag cushions are shown having rear pleats. According to the exemplary embodiment shown in FIG. 10A, the knee airbag cushion 445 includes a front panel 446 connected to a rear panel 447 along a seam 448 to form an inflatable chamber. The rear panel 447 includes a rear pleat 452 folded into the inflatable chamber of the cushion and configured as described below. According to the exemplary embodiment shown in FIG. 10B, the knee airbag cushion 645 includes a front panel 646 connected to a rear panel 647 along a seam 648 to form an inflatable chamber. The rear panel 647 includes a rear pleat 652 folded away from the inflatable chamber of the cushion and configured as described below.

The rear panels 447, 647 have cross-sectional vertical lengths Lr that are longer than the cross-sectional vertical lengths Lf of the respective front panel 446, 646 to cause the airbag cushion 445, 645 to deploy upwardly. The cross-sectional vertical lengths Lf of the front panels 446, 646 for airbag cushions 445, 645 are measured from the upper edge of the seam 448, 648 to the lower edge of the seam 448, 648 since the seams 448, 648 are located at the substantial mid-depth (or thickness) of the airbag cushions upon deployment. Additionally, the cross-sectional vertical lengths Lr of the rear panels 447, 647 for the airbag cushions 445, 645 are measured from the upper edge of the seam 448, 648 to the lower edge of the seam 448, 648 since the seams 448, 648 are located at the substantial mid-depth of the airbag cushions upon deployment. According to an exemplary embodiment, the cross-sectional vertical lengths taken along the front and rear panels are taken at substantially the mid-width of the panels in the cross-car direction.

Figures 5A, 5B, 6:
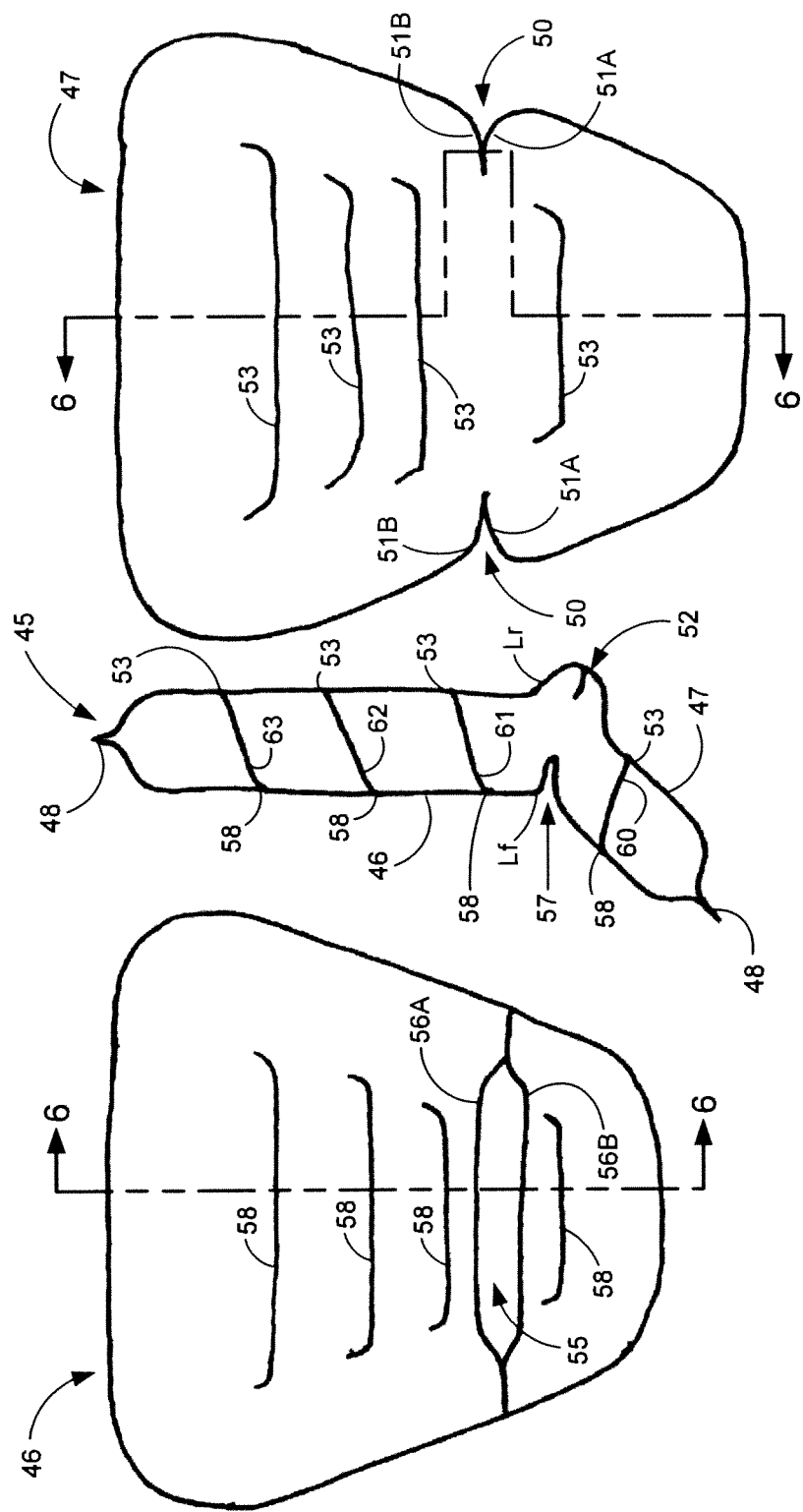
FIG. 5A is a front view of an exemplary embodiment of a front panel for use in a knee airbag cushion and illustrated in the flat prior to connecting to the rear panel.
FIG. 5B is a rear view of an exemplary embodiment of a rear panel for use in a knee airbag cushion and illustrated in the flat prior to connecting to the front panel.
FIG. 6 is a side cross-sectional view of an exemplary embodiment of a knee airbag cushion illustrated inflated or deployed, and formed from the panels shown in FIGS. 5A and 5B.

With reference to FIGS. 5A-6, another exemplary embodiment of a knee airbag cushion 45 is shown to include a first (or front) panel 46 (illustrated by FIG. 5A), a second (or rear) panel 47 (illustrated by FIG. 5B), and four tethers 60, 61, 62, 63. The rear panel 47 includes four seams 53 configured to extend substantially in the horizontal direction, each at a varying height location and offset by a distance. The length of each seam 53 and the offset distance between two adjacent seams 53 may be similar or different than the offset distance between two different adjacent seams 53. According to an exemplary embodiment, each of the four seams 53 is configured to couple the interior surface of the rear panel 47 to one end of one of the tethers 60, 61, 62, 63. The front panel 46 includes four seams 58 configured to extend substantially in the horizontal direction, each at a varying height location and offset by a distance. The length of each seam 58 and the offset distance between two adjacent seams 58 may be similar or different than the offset distance between two different adjacent seams 58. According to an exemplary embodiment, each of the four seams 58 is configured to couple the interior surface of the front panel 46 to the end of the tethers 60, 61, 62, 63 that is opposite the end coupled to the interior of the rear panel 47.

According to other embodiments, the airbag cushion includes a front panel, a rear panel and a plurality of tethers. The tethers may couple externally to the front and rear panels of the airbag cushion, such as to the exterior surfaces of the panels, or may couple internally to the panels of the airbag cushion.

According to an exemplary embodiment, the front panels 46, 346, 446 and rear panels 47, 347, 447 are made from high strength woven nylon fabric and trimmed (or cut) in the flat to have substantially trapezoidal shaped profiles (i.e., the panels are substantially trapezoidal shaped). According to other embodiments, the panels may be made from any suitable high strength airbag material now known or developed in the future, and the panels may be trimmed in the flat to form any suitable shape (e.g., triangular, rectangular, non-uniform), which may be tailored to different airbag modules or vehicle configurations. According to an exemplary embodiment, the front panel 446 is trimmed in the flat to have substantially the same shape and size as the rear panel 447. According to other embodiments, the front panel may vary in shape and size from the rear panel. For example, the front panel 46 has a substantially similar width but is shorter in vertical length (i.e., height while in the flat), than the rear panel 47.

Figure 9C:
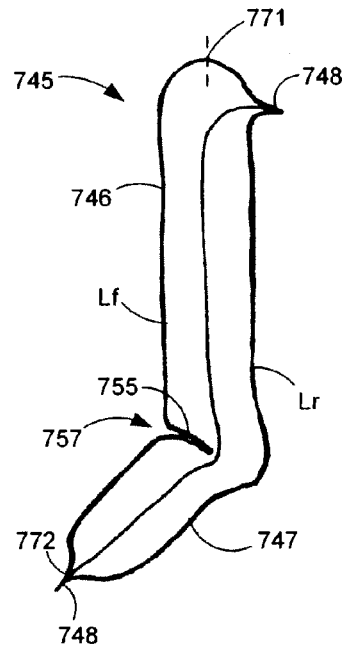
FIG. 9C is a side view of another exemplary embodiment of a knee airbag cushion having a front pleat located on the front panel.
Figure 9D:
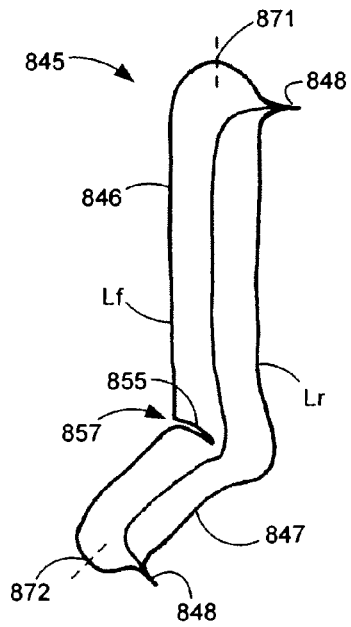
FIG. 9D is a side view of another exemplary embodiment of a knee airbag cushion having a front pleat located on the front panel.

With reference to FIGS. 9C and 9D, exemplary embodiments of knee airbag cushions are shown having front pleats and with seams not located at the substantial mid-depth (or thickness) of the airbag cushion. According to the exemplary embodiment shown in FIG. 9C, the knee airbag cushion 745 includes a front panel 746 connected to a rear panel 747 along a seam 748 to form an inflatable chamber. The front panel 746 includes a front pleat 757 having a fold 755 tucked into the inflatable chamber of the cushion 745 and configured as described herein. The lower edge of the seam 748 of the cushion 745 is configured substantially at the mid-depth of the cushion 745. The upper edge of the seam 748 of the cushion 745 is configured offset from the upper mid-depth location 771 of the cushion 745.

The front panel 746 has a cross-sectional vertical length Lf that is shorter than the cross-sectional vertical length Lr of the rear panel 747 to cause the airbag cushion 745 to deploy upwardly. The cross-sectional vertical length Lf of the front panel 746 for airbag cushion 745 is measured from the upper mid-depth location 771 (and not from the upper edge of the seam 748) to the lower edge of the seam 748, since only the lower edge of the seam 748 is located at the substantial mid-depth (or thickness) of the airbag cushion upon deployment. Additionally, the cross-sectional vertical length Lr of the rear panel 747 for the airbag cushion 745 is measured from the upper mid-depth location 771 (and not from the upper edge of the seam 748) to the lower edge of the seam 748, since only the lower edge of the seam 748 is located at the substantial mid-depth (or thickness) of the airbag cushion upon deployment. According to an exemplary embodiment, the cross-sectional vertical lengths taken along the front and rear panels are taken at substantially the mid-width of the panels in the cross-car direction.

According to the exemplary embodiment shown in FIG. 9D, the knee airbag cushion 845 includes a front panel 846 connected to a rear panel 847 along a seam 848 to form an inflatable chamber. The front panel 846 includes a front pleat 857 having a fold 855 tucked into the inflatable chamber of the cushion 845 and configured as described herein. The lower edge of the seam 848 of the cushion 845 is configured offset from the lower mid-depth location 872 of the cushion 845, and the upper edge of the seam 848 is configured offset from the upper mid-depth location 871 of the cushion 845.

The front panel 846 has a cross-sectional vertical length Lf that is shorter than the cross-sectional vertical length Lr of the rear panel 847 to cause the airbag cushion 845 to deploy upwardly. The cross-sectional vertical length Lf of the front panel 846 for airbag cushion 845 is measured from the upper mid-depth location 871 (and not from the upper edge of the seam 848) to the lower mid-depth location 872 (and not to the lower edge of the seam 848), since both the lower and upper edges of the seam 848 are located offset from the substantial mid-depths (or thicknesses) of the airbag cushion upon deployment. Additionally, the cross-sectional vertical length Lr of the rear panel 847 for the airbag cushion 845 is measured from the upper mid-depth location 871 (and not from the upper edge of the seam 848) to the lower mid-depth location 872 (and not to the lower edge of the seam 848), since both the lower and upper edges of the seam 848 are located offset from the substantial mid-depths (or thicknesses) of the airbag cushion upon deployment. According to an exemplary embodiment, the cross-sectional vertical lengths taken along the front and rear panels are taken at substantially the mid-width of the panels in the cross-car direction.

It should be noted that the cross-sectional vertical lengths Lf and Lr of the front and rear panels, respectively, are measured from locations on the airbag cushion corresponding to the approximate mid-depths of the cushion regardless of the actual profile lengths of the front and rear panels. This is to reflect the true nature of the forces imparted on the interior surfaces of the cushion resulting from the high internal pressure within the inflatable chamber caused by inflation gas. The forces acting on the interior of the cushion are directed normal to the portion of the cushion receiving the forces. Thus, the forces acting on the cushion may change vectors relative to the mid-depth of the cushion and not relative to the seam. Since, the forces acting on the cushion may influence deployment trajectory of the cushion, for example by bringing one portion (e.g., a portion of the front panel) of the cushion into tension prior to a second portion (e.g., a portion of the rear panel) of the cushion, the lengths Lf and Lr are measured from locations on the airbag cushion approximating the mid-depths of the cushion. For the embodiments having airbag cushions where the seam substantially corresponds to the mid-depths of the cushion, such as cushions 45, 345, 445, 545, 645, then the lengths Lf and Lr may be defined by the lengths between the upper edge of the seam and the lower edge of the seam, since the seams substantially represent the mid-depths of the cushion.

According to an exemplary embodiment, the rear panel 47, 447 includes a rear pleat 52, 452. According to an exemplary embodiment, the rear panel 47 includes a notch 50 formed along the periphery of each side of the rear panel 47, whereby each notch 50 forms a first edge portion 51A and a second edge portion 51B. The first edge portion 51A is connected, such as by stitching, to the second edge portion 51B to form the rear pleat 52. The rear pleat 52, 452 allows the perimeter of the rear panel 47, 447 to substantially match the perimeter of the corresponding front panel 46, 446, whereby the rear panel 47, 447 has a cross-sectional vertical length Lr that is longer than the cross-sectional vertical length Lf of the corresponding front panel 46, 446 to cause the airbag cushion 45, 445 to deploy upwardly. The cross-sectional vertical length Lr of rear panel 47 may be measured from the upper seam 48 to the lower seam 48. The cross-sectional vertical length Lr of rear panel 447 may be measured from the upper seam 448 to the lower seam 448. Another example, the cross-sectional vertical length Lr of the rear panel 47 may be measured from the seam 53 for the tether 60 to the seam 53 for the tether 61.

According to an exemplary embodiment, the front panel 46, 346 includes a front pleat 57, 357. According to an exemplary embodiment, the front panel 46 includes an opening 55 having a first edge 56A and a second edge 56B, whereby the first edge 56A and the second edge 56B are connected together, such as by stitching, to form the front pleat 57. According to another exemplary embodiment, the front panel 346 includes a folded portion 355, whereby the front pleat 357 is formed by tucking the folded portion 355 into the inflatable chamber. According to another exemplary embodiment, the front pleat may be formed by folding the fold (i.e., at least two layers of overlapping portions of the panel) away from the inflatable chamber. According to another exemplary embodiment, the folded portion forming the front pleat may be maintained by a seam, such as a stitch, configured to connect the adjacent folded portions of the front panel.

The front pleat 57, 357 allows the perimeter of the front panel 46, 346 to substantially match the perimeter of the corresponding rear panel 47, 347, whereby the rear panel 47, 347 has a cross-sectional vertical length Lr that is longer than the cross-sectional vertical length Lf of the corresponding front panel 46, 346 to cause the airbag cushion 45, 345 to deploy upwardly. The cross-sectional vertical lengths Lf and Lr may be measured from seam to seam, as described above, where the seams substantially align with the mid-depths of the cushion. For example, the cross-sectional vertical length Lr of rear panel 47 may be measured from the upper seam 48 to the lower seam 48, and the cross-sectional vertical length Lf of front panel 46 may be measured from the upper seam 48 to the lower seam 48. Another example, the cross-sectional vertical lengths Lr and Lf may be measured from the seam 53 for the tether 60 to the seam 53 for the tether 61 and from the seam 58 for the tether 60 to the seam 58 for the tether 61, respectively.

According to an exemplary embodiment, the length of Lf is less than the length of Lr, so that during deployment of the airbag cushion 45 the front panel 46 of the airbag cushion 45 will come into tension prior to the rear panel 47 of the cushion 45 to tailor the deployment trajectory of the cushion, such as upwardly along the dashboard. The time from the initiation of deployment of the cushion until the time that the front panel 46 comes into tension and the time from when the front panel 46 comes into tension until the rear panel 47 comes into tension may be varied (e.g., by varying the lengths of Lf and Lr) to tailor the trajectory of the deploying airbag cushion to unfold or deploy around varying vehicle geometries, such as the dashboard of the vehicle.

Figure 7A:
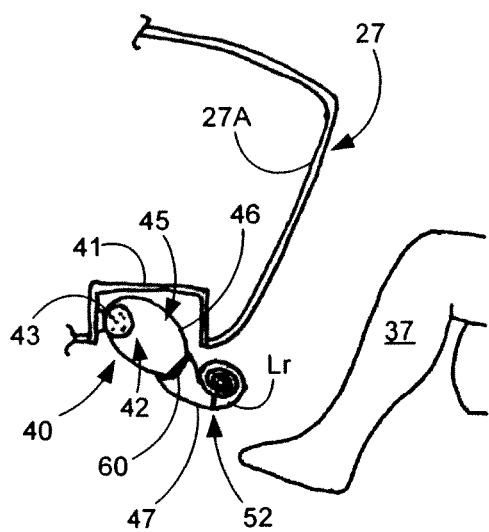
FIG. 7A is a side view of the knee airbag module of FIG. 4A shown during the early stages of deployment of the airbag cushion.
Figure 7B:
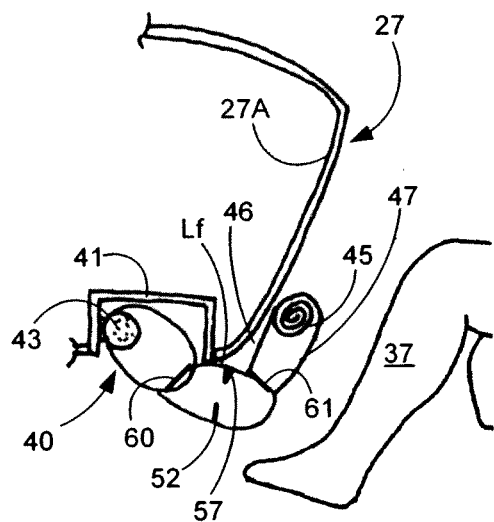
FIG. 7B is a side view of the knee airbag module of FIG. 4A shown during the intermediate stages of deployment of the airbag cushion.

According to an exemplary embodiment, the airbag module 40 is configured to allow the deploying airbag cushion 45 to deploy in an oblique downward and rearward direction in the time between initial deployment and when the front panel 46 comes into tension. The airbag cushion 45 is configured to breach through the dashboard or instrument panel 27 through the opening 42 prior to tensioning the front panel 46 and/or the front pleat 57, such as shown in FIG. 7A. After the cushion has deployed to a position clear of the lower lip of the dashboard 27, the front pleat 57 and/or front panel 46 of the airbag cushion 45 come into tension, influencing the trajectory of the deploying airbag to change from an oblique downward and rearward direction to an oblique upward and rearward direction along the rearward wall 27A of the dashboard 27, such as shown in FIG. 7B. At a time after the front panel 46 and/or front pleat 57 is put into tension, the rear panel 47 and/or rear pleat 52 is put into tension and together with the tension in front panel 46 and/or the front pleat 57 the deployment trajectory of the airbag cushion 45 is influenced to deploy along the profile of the rearward wall 27A of the dashboard 27.

The airbag cushion 45 configuration having a front panel 46 with a length Lf shorter than the length Lr of the rear panel 47 allows the airbag cushion to transition from the intermediate phase of deployment (i.e., deploying substantially rearward) to the ending phase of deployment (i.e., deploying upward and rearward). This transition may be created by the front (or first) panel going into tension prior to the rear (or second) panel due to the length Lf being shorter than the length Lr. The tension is induced by an increasing internal pressure within the cushion caused by the generated inflation gas, whereby at a predetermined internal cushion pressure, the tension in the front panel will pull the deploying edge of the airbag cushion in an upwardly direction, such as in an upward and rearward oblique direction. The rear panel will have tension, but will have less tension than the front panel, so the airbag may continue to deploy in the upwardly direction. The airbag cushion deployment may be tailored by changing the difference in length between the length Lf and the length Lr, and those skilled in the art will recognize that the angle (e.g., relative to vertical) of deployment during the ending deployment phase of the cushion can be tailored by adjusting lengths Lf and Lr of the front and rear panels.

According to another exemplary embodiment, the front pleat 57 is formed by taking a first portion of the first panel 46 and folding it once over a second portion of first panel 46, then placing a structural stitch to couple the first and second portions of the panel 46 together. According to other embodiments, the front pleat may be formed by taking any number of portions of the panel and folding them onto other portions, then coupling them with any suitable fastening means (including stitching). The front pleat may include any method of reducing the length of Lf or the profile of the length of the first panel along the cushion. According to an exemplary embodiment, the width of the pleat 57 (i.e., its length in the cross-car direction) is approximately between one half and two-thirds the width of the panel. According to other embodiments, the width of the pleat 57 may run substantially the width of the panel, or may be substantially less than half the width of the panel. Those skilled in the art will recognize that the width of the pleat 57 may be varied to tailor the deployment trajectory of the airbag during the ending phase of deployment.

According to an exemplary embodiment, the second panel 47 is larger than the first panel 46 in the flat, whereby the second panel 47 includes a rear pleat 52 forming an outer peripheral length for the second panel 47 that is substantially the same as the outer peripheral length of the first panel 46. The rear pleat 52 may be formed by taking a portion, such as a portion of the edge, of the panel and folding or creasing the portion over an adjacent portion of the panel, so that the outer peripheral length may be reduced, but during deployment of the airbag cushion 45, a small tension may unfold the folded portion.

Figure 8B:
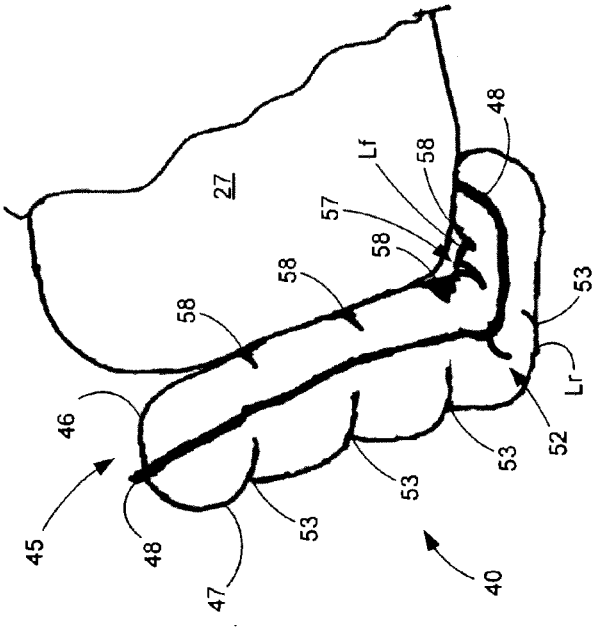
FIG. 8B is a side view of the deployed airbag module of FIG. 8A.

The outer peripheral lengths of the panels may be coupled through conventional methods (e.g., stitching) to form seams 48 of the airbag cushion 45, as shown in FIGS. 6 and 8B. During deployment of the cushion, the first panel 46 may be put into tension prior to the second panel 47 with the length Lf being shorter than the length Lr, whereby the pleat 57 (and hence the stitching of the pleat 57) is subjected to loading prior to the pleat 52. The pleat 57 being structural is able to withstand the loading, thereby tailoring the deployment trajectory of the knee airbag cushion.

According to another exemplary embodiment, the airbag cushion includes a plurality of tethers to further tailor deployment trajectory. The tethers may be included whereby the tethers bridge both the front and rear panels of the airbag cushion, so that the distance between two adjacent tethers on the front panel is shorter than the distance between the two corresponding and adjacent tethers on the rear panel. This configuration induces more upward driving forces on the cushion during deployment, by increasing the tension in the front panel relative to the rear panel. Those skilled in the art will recognize that an airbag cushion as disclosed herein may be configured with any number of tethers, and the embodiments shown herein are not meant as limitations.

The storage configuration of the airbag cushion may be tailored to influence the deployment trajectory to aid the cushion in deploying to the desired final position. For example, the airbag cushion may be rolled using a forward roll (i.e., a roll where the cushion is rolled in a direction forward or toward the dashboard side of the cushion) to induce the cushion to deploy with forces directing the cushion along and toward the dashboard instead of toward the occupant.

Figure 8A:
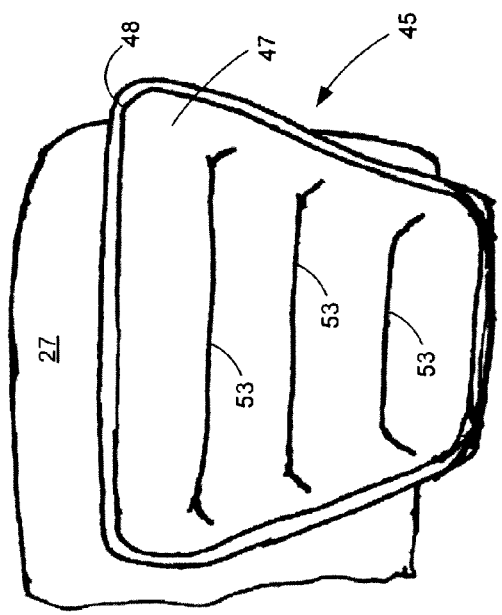
FIG. 8A is a rear view of an exemplary embodiment of an airbag module having a knee airbag cushion deployed from the dashboard of a vehicle.

With reference to FIGS. 8A and 8B, the airbag module 40 is shown deployed to provide protection to the occupant (not shown), such as the lower legs of the occupant. During a frontal impact of the vehicle, the deployed knee airbag cushion 45 of the airbag module 40 can substantially reduce the tendency of the occupant to submarine and can prevent direct contact or impact of the occupant (e.g., the knees of the occupant) with features (e.g., dashboard 27) of the vehicle, reducing the likelihood of occupant injury.

According to an exemplary embodiment, the airbag cushion 45 of the airbag module 40 is configured to deploy in three phases. The first or the initial phase is where the airbag cushion deploys substantially downward through the opening in the housing (and/or in the dashboard) until the airbag cushion 45 is substantially free from or breaches the housing so that the cushion substantially becomes external to the housing and the dashboard. The second or the intermediate phase is where the airbag cushion 45 deploys substantially rearward toward the occupant to extend substantially up to or beyond the rearward edge of the lower portion of the dashboard to prevent the cushion from having a delayed third phase of deployment caused by a portion of the cushion snagging or catching on a portion of the dashboard. The third or final phase is where the airbag cushion 45 deploys upward and/or rearward to a final deployed position between the occupant, such as the lower legs of the occupant, and the dashboard 27.

The configuration of the passenger compartment varies from vehicle to vehicle, with each having a different shape for the dashboard or instrument panel, and having varying geometries, such as the distance from dashboard to occupant. Those skilled in the art will recognize that the airbag cushions disclosed herein may be configured to accommodate the varying passenger compartments. The airbag cushions may be configured to accommodate varying geometries by tailoring the phases of deployment to specific customer requirements.

Figure 7C:
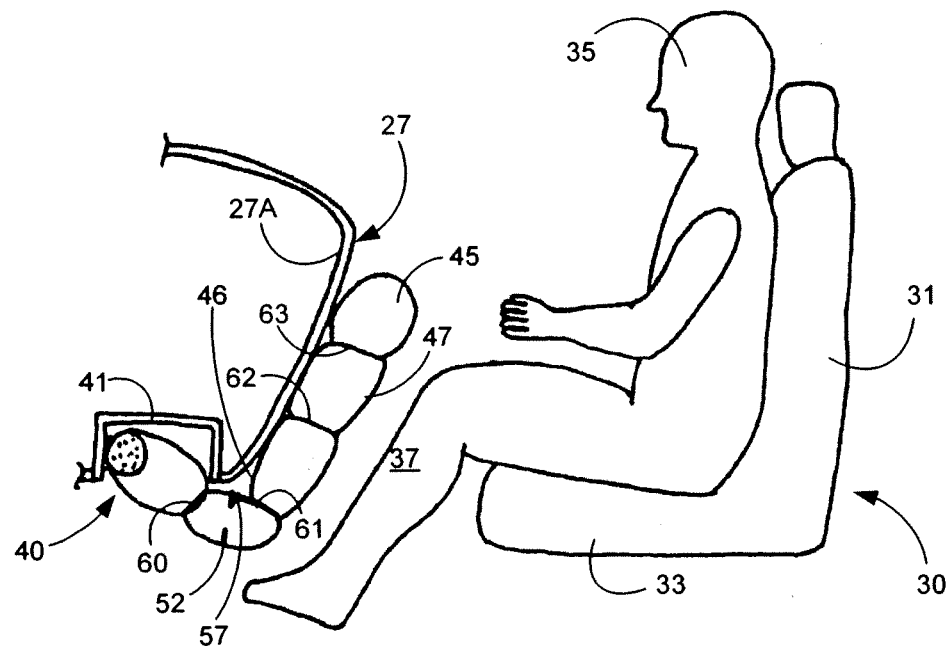
FIG. 7C is a side view of the knee airbag module of FIG. 4A shown during the final stages of deployment of the airbag cushion.

The airbag modules (e.g., knee airbag modules) disclosed herein improve occupant protection (or safety) by reducing or substantially eliminating the punch force or the force exerted by the airbag onto the occupant during deployment. The punch force is reduced or eliminated due to the airbag cushion configuration deploying in a direction substantially parallel to the length of the lower portion of the legs of the occupant, as shown in FIG. 7C. Conventional knee airbags deploy rearward directly toward the occupant and imparting the occupant with a significant punch force, as shown in FIG. 3B. The punch force from conventional knee airbags is exacerbated when small occupants (e.g., fifth percentile occupants) are involved.

The airbag modules having knee airbag cushions, as disclosed herein, by primarily inflating in a direction parallel to the legs of the occupant and not directly into the legs of the occupant, significantly reduce the punch force onto the occupant. Additionally, the airbags, as disclosed herein, may have an increased speed of deployment without having a subsequent increase in the punch force onto the occupant, where conventional airbags would have a relative increase in punch force with increased deployment speed. The configuration of coupling the airbag module to the lower portion of the dashboard also allows for more utility in the vehicle, such as increased glove box volume, or for inclusion of other components (e.g., CD changer) into the dashboard space to increase utility to the user.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbags as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A knee airbag module for protecting a vehicle occupant comprising:
   a housing containing an inflatable airbag and an inflator for providing gas for inflating the airbag; and
   wherein the inflatable airbag is configured to inflate and deploy out of the housing into a position forward of knees of the vehicle occupant;
   where the inflatable airbag includes front and rear panels that are connected together to form an inflatable chamber;
   wherein when the inflatable airbag deploys the front panel is adjacent to an instrument panel of the vehicle and the rear panel is adjacent to the vehicle occupant;
   wherein the front panel includes an opening and wherein edges of the opening are connected together to form a substantially horizontal pleat so that a cross-sectional vertical length of the front panel is shorter than a cross-sectional vertical length of the rear panel; and
   wherein the inflatable airbag first deploys rearwardly and then upwardly to a position where the front panel is adjacent to an instrument panel of the vehicle and the rear panel is adjacent to the vehicle occupant.

2. A knee airbag module for protecting a vehicle occupant comprising:
   a housing containing an inflatable airbag and an inflator for providing gas for inflating the airbag; and
   wherein the inflatable airbag is configured to inflate and deploy out of the housing into a position forward of knees of the vehicle occupant;
   where the inflatable airbag includes front and rear panels that are connected together to form an inflatable chamber;
   wherein when the inflatable airbag deploys the front panel is adjacent to an instrument panel of the vehicle and the rear panel is adjacent to the vehicle occupant;
   wherein a cross-sectional vertical length of the front panel is shorter than a cross-sectional vertical length of the rear panel thereby causing the inflatable airbag to deploy upwardly;
   wherein at least one of the front and rear panels includes a substantially horizontal pleat thereby resulting in the cross-sectional vertical length of the front panel being shorter than the cross-sectional vertical length of the rear panel;
   wherein the substantially horizontal pleat is in the front panel; and
   wherein the front panel includes an opening and the substantially horizontal pleat is formed in the front panel by connecting edges of the opening.

3. A knee airbag module for protecting a vehicle occupant comprising:
   a housing containing an inflatable airbag and an inflator for providing gas for inflating the airbag; and
   wherein the inflatable airbag is configured to inflate and deploy out of the housing into a position forward of knees of the vehicle occupant;
   where the inflatable airbag includes front and rear panels that are connected together to form an inflatable chamber;
   wherein when the inflatable airbag deploys the front panel is adjacent to an instrument panel of the vehicle and the rear panel is adjacent to the vehicle occupant;
   wherein a cross-sectional vertical length of the front panel is shorter than a cross-sectional vertical length of the rear panel thereby causing the inflatable airbag to deploy upwardly;
   wherein at least one of the front and rear panels includes a substantially horizontal first pleat thereby resulting in the cross-sectional vertical length of the front panel being shorter than the cross-sectional vertical length of the rear panel;
   wherein the substantially horizontal first pleat is in the front panel, and
   further comprising a second pleat in the rear panel, wherein the second pleat is configured to reduce the perimeter of the rear panel to substantially match the perimeter the front panel.

4. The airbag module of claim 3, wherein the front panel includes a folded portion and the substantially horizontal first pleat is formed by tucking the folded portion into the inflatable chamber.

5. The airbag module of claim 4, wherein the front panel includes a substantially horizontal seam positioned to maintain the folded portion in the inflatable chamber.

6. The airbag module of claim 3, wherein the front panel includes a folded portion and the substantially horizontal first pleat is formed to extend away from the inflatable chamber.

7. A knee airbag module for protecting a vehicle occupant comprising:
   a housing containing an inflatable airbag and an inflator for providing gas for inflating the airbag; and
   wherein the inflatable airbag is configured to inflate and deploy out of the housing into a position forward of knees of the vehicle occupant;
   where the inflatable airbag includes front and rear panels that are connected together to form an inflatable chamber;
   wherein when the inflatable airbag deploys the front panel is adjacent to an instrument panel of the vehicle and the rear panel is adjacent to the vehicle occupant;
   wherein a cross-sectional vertical length of the front panel is shorter than a cross-sectional vertical length of the rear panel thereby causing the inflatable airbag to deploy upwardly;
   wherein at least one of the front and rear panels includes a substantially horizontal pleat thereby resulting in the cross-sectional vertical length of the front panel being shorter than the cross-sectional vertical length of the rear panel; and
   wherein prior to connecting the first and second panels together to form the airbag cushion the length of the perimeter of the rear panel is greater than the length of the perimeter for the front panel, and wherein the pleat is in the rear panel.

8. The airbag module of claim 7, wherein the pleat is formed by a connected pair of edge portions of the rear panel to thereby reduce the perimeter of the rear panel to substantially match the perimeter of the front panel.

9. The airbag module of claim 8, wherein the rear panel includes a second pleat formed on a horizontally opposite side of the perimeter of the rear panel.

10. A knee airbag cushion for use in an airbag module for restraining a vehicle occupant comprising:
    a front panel, and
    a rear panel connected to the front panel to form an inflatable chamber;

wherein the inflatable chamber is configured to inflate to deploy the airbag cushion out of the airbag module into a position forward of the lower legs of the vehicle occupant;

wherein when the airbag deploys to the position forward of the lower legs of the occupant the front panel is adjacent to an instrument panel of the vehicle and the rear panel is adjacent to the vehicle occupant;

wherein a cross-sectional vertical length of the front panel is shorter than a cross-sectional vertical length of the rear panel thereby causing the airbag to deploy upwardly;

wherein at least one of the front and rear panels of the airbag cushion includes a substantially horizontal pleat thereby resulting in the cross-sectional vertical length of the front panel being shorter than the cross-sectional vertical length of the rear panel;

wherein the substantially horizontal pleat is in the front panel; and wherein the front panel includes an opening and the pleat is formed in the front panel connecting the edges of the opening.

11. A knee airbag cushion for use in an airbag module for restraining a vehicle occupant comprising:

a front panel, and a rear panel connected to the front panel to form an inflatable chamber;

wherein the inflatable chamber is configured to inflate to deploy the airbag cushion out of the airbag module into a position forward of the lower legs of the vehicle occupant;

wherein when the airbag deploys to the position forward of the lower legs of the occupant the front panel is adjacent to an instrument panel of the vehicle and the rear panel is adjacent to the vehicle occupant;

wherein a cross-sectional vertical length of the front panel is shorter than a cross-sectional vertical length of the rear panel thereby causing the airbag to deploy upwardly;

wherein at least one of the front and rear panels of the airbag cushion includes a substantially horizontal first pleat thereby resulting in the cross-sectional vertical length of the front panel being shorter than the cross-sectional vertical length of the rear panel;

wherein the substantially horizontal first pleat is in the front panel; and further comprising a second pleat located in the rear panel, wherein the second pleat is configured to reduce the perimeter of the rear panel to substantially match the perimeter the front panel.

12. The airbag cushion of claim 11, wherein the front panel includes a folded portion and the substantially horizontal first pleat is formed by tucking the folded portion into the inflatable chamber.

13. The airbag cushion of claim 12, wherein the front panel includes a substantially horizontal seam positioned to maintain the folded portion in the inflatable chamber.

14. The airbag module of claim 11, wherein the front panel includes a folded portion and the substantially horizontal first pleat is formed to extend away from the inflatable chamber.

15. A knee airbag cushion for use in an airbag module for restraining a vehicle occupant comprising:

a front panel, and a rear panel connected to the front panel to form an inflatable chamber;

wherein the inflatable chamber is configured to inflate to deploy the airbag cushion out of the airbag module into a position forward of the lower legs of the vehicle occupant;

wherein when the airbag deploys to the position forward of the lower legs of the occupant the front panel is adjacent to an instrument panel of the vehicle and the rear panel is adjacent to the vehicle occupant;

wherein a cross-sectional vertical length of the front panel is shorter than a cross-sectional vertical length of the rear panel thereby causing the airbag to deploy upwardly;

wherein at least one of the front and rear panels of the airbag cushion includes a substantially horizontal pleat thereby resulting in the cross-sectional vertical length of the front panel being shorter than the cross-sectional vertical length of the rear panel; and wherein prior to connecting the first and second panels together to form the airbag cushion the length of the perimeter of the rear panel is greater than the length of the perimeter for the front panel, and wherein the pleat is located in the rear panel.

16. The airbag cushion of claim 15, wherein the pleat is formed by a connected pair of edge portions of the rear panel to thereby reduce the perimeter of the rear panel to substantially match the perimeter of the front panel.

17. The airbag cushion of claim 16, wherein the rear panel includes a second pleat formed on a horizontally opposite side of the perimeter of the rear panel.

* * * * *